United States Patent

Kuwahara et al.

[11] Patent Number: 5,848,133
[45] Date of Patent: Dec. 8, 1998

[54] INFORMATION PROCESSING APPARATUS HAVING SPEAKER PHONE FUNCTION

[75] Inventors: Kazuyoshi Kuwahara, Tokyo; Koichi Kaji, Hidaka, both of Japan

[73] Assignee: Kabushiki Kaisha Toshiba, Kawasaki, Japan

[21] Appl. No.: 795,941

[22] Filed: Feb. 5, 1997

[30] Foreign Application Priority Data

Feb. 29, 1996 [JP] Japan ................................. 8-043544

[51] Int. Cl.⁶ ................................................. H04M 11/00
[52] U.S. Cl. ................................. 379/93.01; 379/387
[58] Field of Search ........................... 379/90.01, 93.01, 379/93.05, 93.06, 93.08, 93.37, 110.01, 93.26, 387, 388, 419, 420; 381/83, 93, 90, 24; 370/435

[56] References Cited

U.S. PATENT DOCUMENTS

| | | | |
|---|---|---|---|
| 5,471,470 | 11/1995 | Sharma et al. | 370/435 |
| 5,526,408 | 6/1996 | Yekutiely | 379/93.26 |
| 5,696,814 | 12/1997 | Tran et al. | 379/110.01 |

*Primary Examiner*—Wing F. Chan
*Attorney, Agent, or Firm*—Finnegan, Henderson, Farabow, Garrett & Dunner, L.L.P.

[57] ABSTRACT

A sound codec has an encoded signal input/output terminal. This terminal is selectively connected to a modem codec. Due to this selective connection, a microphone and a speaker, both connected to a sound signal input/output terminal of the sound codec, are used as a transceiver of the speaker phone, and the sound codec is controlled to function as a speaker phone codec.

14 Claims, 4 Drawing Sheets

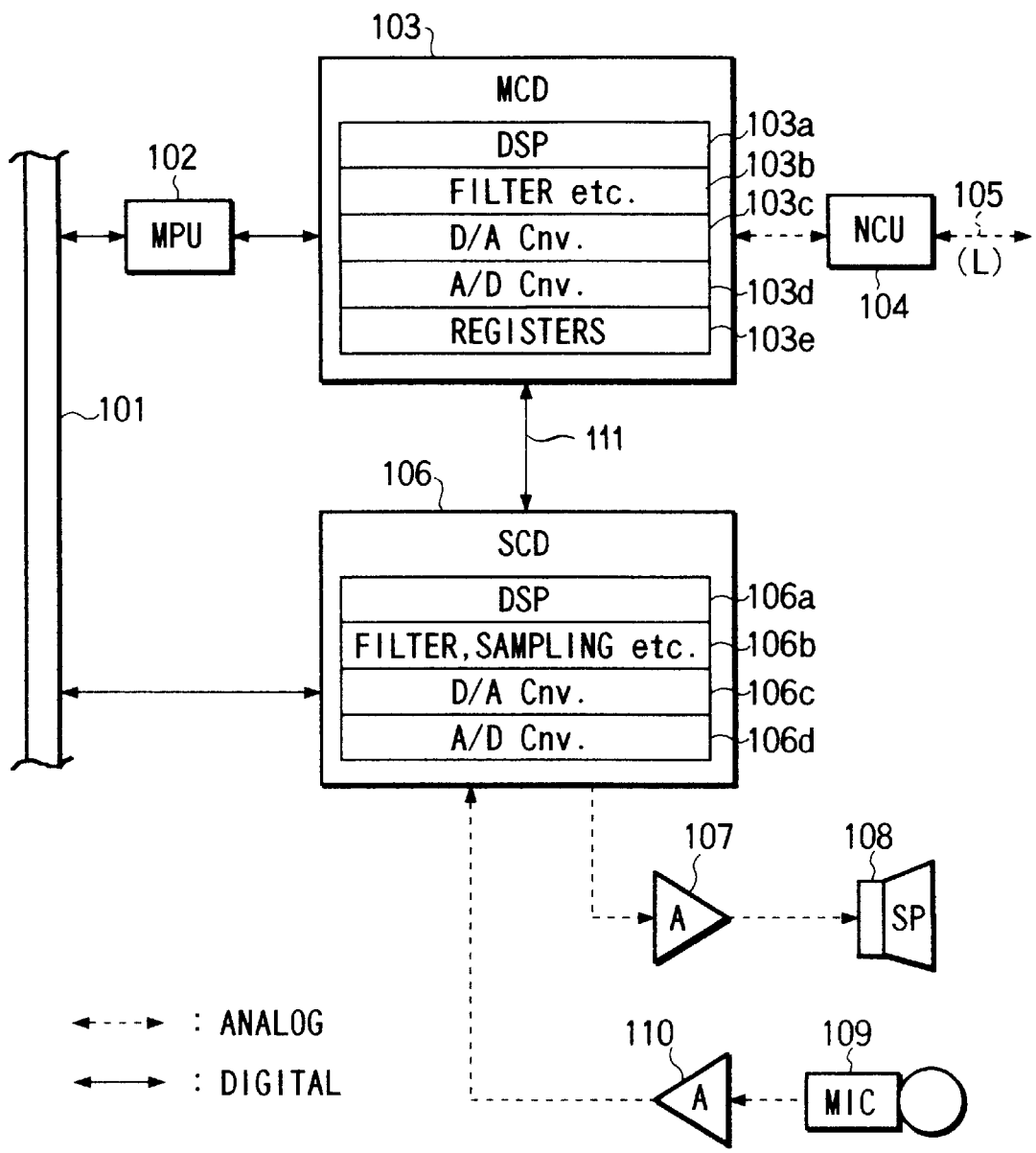
F I G. 1

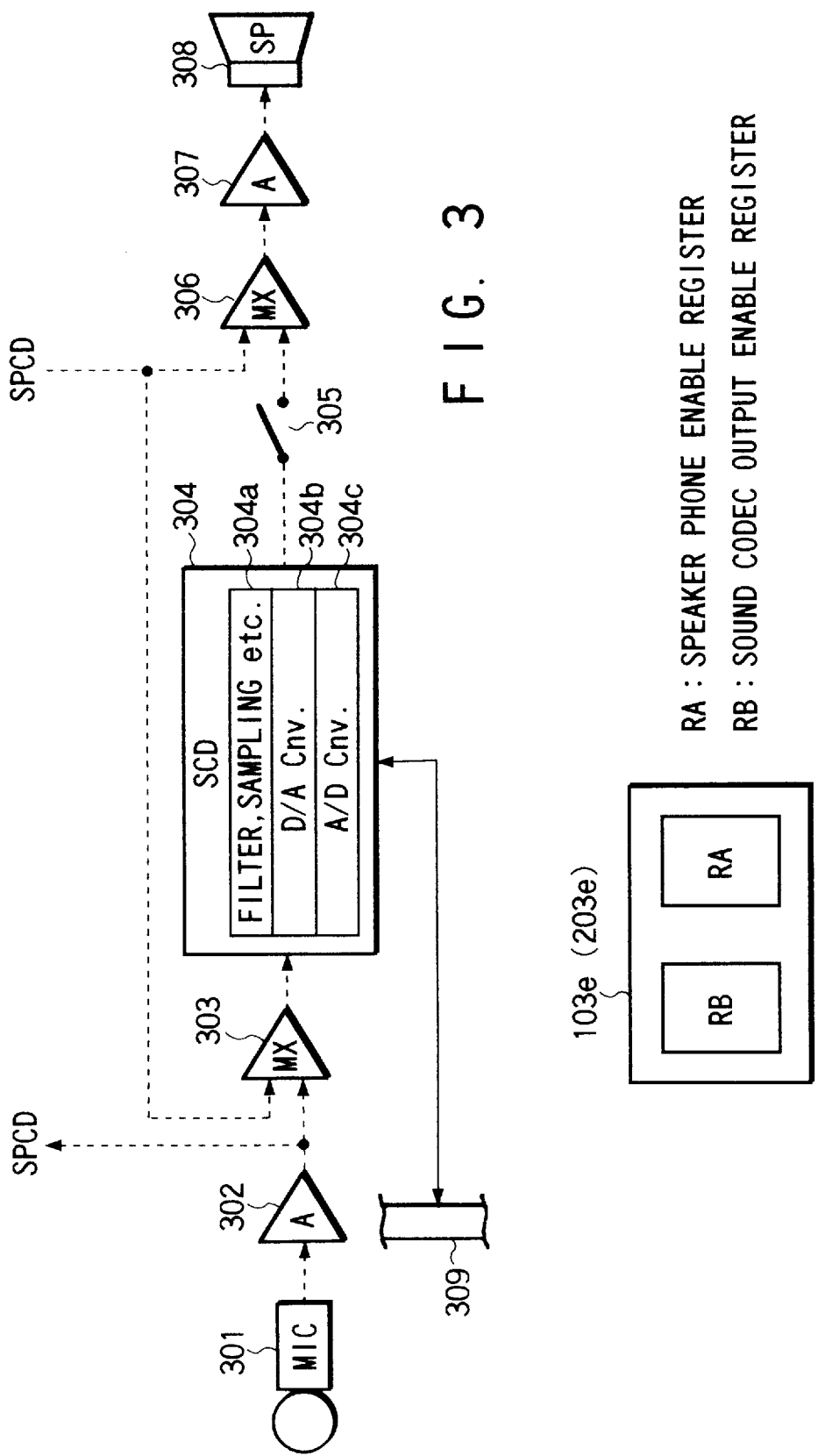

INFORMATION PROCESSING APPARATUS HAVING SPEAKER PHONE FUNCTION

BACKGROUND OF THE INVENTION

The present invention relates to a method for manufacturing a speaker phone employed in an information processing apparatus, and also to an information processing apparatus having a speaker phone function. More specifically, the present invention relates to a method for manufacturing a speaker phone which is employed in an information processing apparatus (e.g., a personal computer) and which achieves a speaker phone function by making good use of a microphone, a modem, a modem codec, a sound codec, etc., and also to an information processing apparatus having such a speaker phone function.

A speaker phone device is known as a means for providing a sound communication function for an information processing apparatus. The speaker phone device supplies sound signals to a telephone network through a line control circuit of the information processing apparatus, and enables sound communication without using a handset, a headset or the like. In relation to such a speaker phone device, applications for a telephone conference or the like are developed.

In the conventional art, this type of speaker phone is provided as an independent module which incorporates a sound input/output device. If the speaker phone is installed in an information processing apparatus such as a personal computer, the circuits and structural components (e.g., a speaker, a microphone, or an amplifier) of the speaker phone are provided for the information processing apparatus, through the information processing apparatus originally incorporates similar circuits or structural components for the sound codec. Accordingly, the circuit configuration becomes redundant in part. Let us consider a case where a user wishes to provide a speaker phone function for a computer which comprises a modem codec, a sound codec, a speaker connected to the sound codec, and a microphone also connected to the sound codec. In this case, the user buys a modem codec having a speaker phone function and installs this modem codec in place of the modem codec originally provided in the computer. Then, the user has to connect the speaker and microphone to the speaker and microphone terminals of the modem codec having a speaker phone. Due to this, the apparatus is inevitably large and heavy. In addition, it is not necessarily easy to install the modem codec in the computer since the installation space of the computer is restricted. In addition to these problems, the conventional method has problems in light of cost since it does not enable utilization of hardware components, such as the speaker, microphone, amplifier circuit, sound codec incorporated inside the computer or externally connected thereto. The conventional method has problems in light of function as well, since the sound communicated by use of the speaker phone cannot be recorded under the control of the information processing apparatus.

BRIEF SUMMARY OF THE INVENTION

Accordingly, an object of the present invention is to provide a method for manufacturing a speaker phone which is employed in an information processing apparatus (e.g., a personal computer, a word processor, or an information processing terminal) and which achieves a speaker phone function by making good use of hardware components such as a microphone, a speaker, an amplifying circuit, a modem codec, a sound codec, etc.

Another object of the invention is to provide an information processing apparatus having such a speaker phone function.

To attain this object, the present invention provides an information processing apparatus which employs a speaker and a microphone. The speaker and microphone are connected to the sound signal input/output terminal of a speaker phone codec, and the encoded signal input/output terminal of this speaker phone codec is connected to a modem codec so that the speaker and microphone originally provided for the information processing apparatus can be used as a speaker phone.

The present invention also provides an information processing apparatus which can employ a sound codec. The coded signal input/output terminal of the sound codec is selectively connected to a modem codec so that the microphone and speaker connected to the sound signal input/output terminal of the modem codec can be used as a transceiver, thereby permitting the sound codec to function as a speaker codec.

The present invention further provides an information processing apparatus which can employ a sound codec and a modem codec. The apparatus comprises a speaker phone codec, and the microphone and speaker connected to the sound signal input/output terminal of the sound codec are connected to the sound signal input/output terminal of the speaker phone codec, and the encoded signal input/output terminal of the speaker phone codec is selectively connected to the modem codec, thereby attaining both a sound processing function of the sound codec and the speaker phone function of the speaker phone codec by use of the same microphone and speaker.

In addition, the present invention provides an information processing apparatus having a sound processing function enabled by a sound codec and a speaker phone function enabled by a speaker phone codec. A transmitted-speech signal input to the speaker phone codec and a received-speech signal output from the speaker phone codec are synthesized, and a signal obtained thereby is supplied to the sound codec. Since the transmitted- and received-speech data of the speaker phone can be picked up from the sound codec, they can be recorded.

Still further, the present invention provides an information processing apparatus having a sound processing function enabled by a sound codec and a speaker phone function enabled by a speaker phone codec. The sound signal output terminal of the sound codec is selectively disconnected from the sound signal output terminal of the sound codec on the basis of a particular control signal, and only the sound signal processed by the speaker phone codec is selectively output.

Still further, the present invention provides an information processing apparatus wherein a modem codec and a sound codec are connected together through a system interface under the control performed by the CPU of the apparatus. The sound codec functions as a speaker codec, and the microphone and speaker connected to the sound codec are used as a transceiver. In this manner, the speaker phone circuit is selectively formed.

According to one aspect of the present invention, a highly directional microphone and a sound output speaker, which are removably contained in an information processing apparatus, can be used as an input/output device of the speaker phone device. It is therefore possible to realize a speaker phone function by making good use of the microphone and speaker originally provided for the information processing apparatus.

According to another aspect of the present invention, a sound codec (a sound modulation/demodulation circuit) used or coding or decoding sound signals is removably contained in an information processing apparatus. The sound codec is connected to a telephone network, and a speaker phone function is realized by employing the sound codec as a codec of the speaker phone device.

According to still another aspect of the present invention, the information processing apparatus contains a sound codec for coding/decoding a sound signal, a speaker phone codec for coding/decoding a sound signal, and a microphone and a speaker for inputting/outputting a sound signal with reference to the sound codec and speaker phone codec. The same microphone and the speaker are used in common to the information processing apparatus and the speaker phone device, and both a sound processing function enabled by the sound codec and a speaker phone function enabled by the speaker phone codec are attained.

The above-mentioned information processing apparatus having a speaker phone function may additionally comprise the following structural elements: an input circuit for inputting a sound input from the microphone to both the sound codec and speaker phone codec; a filtering means, provided for the speaker phone codec, for filtering those sound components which are generated from the speaker and then input to the microphone; and a recording means for recording the sound output from the sound codec. If these structural elements are added, the speaker phone circuit obtained thereby has a function of recording the speech made through the speaker phone.

The above-mentioned information processing apparatus having a sound processing function and a speaker phone function may additionally comprise the following structural elements: means for adding a sound signal output from the speaker phone codec to a sound signal supplied from the microphone to the speaker codec and for supplying the resultant signal to the sound codec; and means for recording a sound output from the sound codec. If these structural elements are added, the speaker phone circuit obtained thereby has a function of recording the speech made through the speaker phone.

The above-mentioned information processing apparatus having a sound processing function and a speaker phone function may additionally comprise a switch for shutting off the sound output from the sound codec. If this switch is provided, the sound output from the sound codec is not supplied to the speaker phone circuit, thereby ensuring a reliable operation of the speaker phone.

According to the present invention, the modem codec and the sound codec are linked together by way of a system interface under the control or processing performed by the CPU of the apparatus. The sound codec functions as a speaker codec, and the microphone and speaker connected to the sound codec are used as a transceiver. Since the speaker phone circuit is selectively formed in this manner, the modem codec does not have to directly exchange sound data with the sound codec, and the speaker phone function can be realized by the processing performed by the CPU of the information processing apparatus. In particular, the speaker phone function can be realized with no need to additionally employ a circuit for attaining a speaker phone function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block circuit diagram showing a configuration according to the first embodiment of the present invention;

FIG. 3 is a block circuit diagram showing a configuration according to the third embodiment of the present invention;

FIG. 4 is a circuit diagram showing the structure of a register employed in the above embodiments.

DETAILED DESCRIPTION OF THE INVENTION

Figure 2:
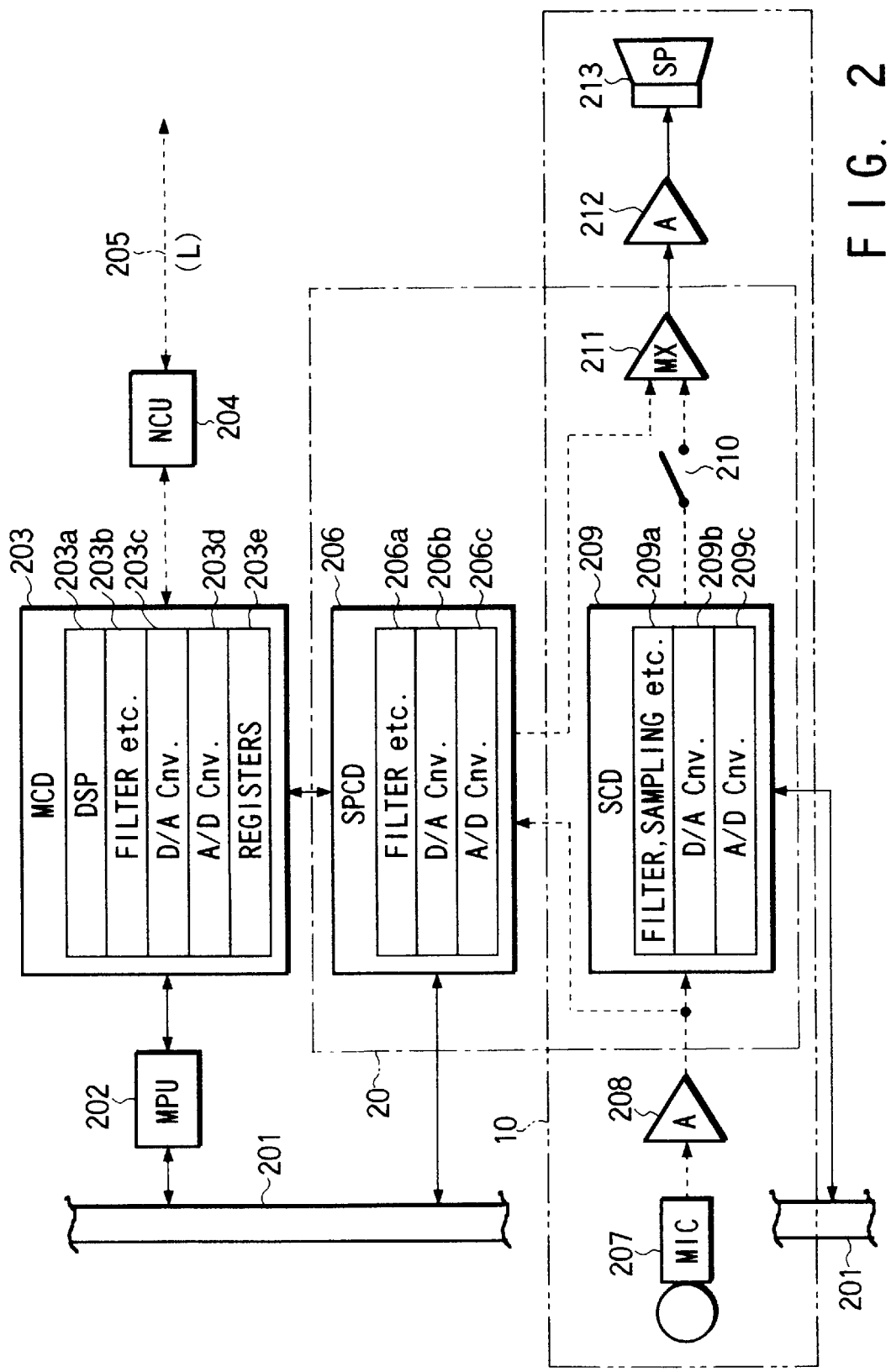
FIG. 2 is a block circuit diagram showing a configuration according to the second embodiment of the present invention.

Embodiments of the present invention will now be described with reference to the accompanying drawings.

A speaker phone device according to the present invention is incorporated in an information processing apparatus or provided to be removable therefrom. The speaker phone device selectively uses an input/output section, a sound processing section, a modem communication circuit, etc. as structural elements of a telephone set.

FIG. 1 is a block circuit diagram showing the structure of a speaker phone device according to the present invention. The speaker phone device is of a type which is incorporated in an information processing apparatus. In the case shown in FIG. 1, the speaker phone function is realized by utilizing a sound codec as the codec of the speaker phone device.

Referring to FIG. 1, reference numeral 101 denotes a system interface of the information processing apparatus. In the embodiment shown in FIG. 1, the system interface connects the system of the information processing apparatus to the speaker phone device incorporated in the information processing apparatus.

Reference numeral 102 denotes an Microprocessing Unit (MPU) provided between the system interface 101 and a modem codec 103 (which will be described below). Under the control of the CPU of the system, the MPU controls the modem codec 103 and an NCU 104.

The modem codec 103 is connected between the MPU 102, the NCU 104 and a sound codec 106. It contains a DSP (digital sound processor) 103a, a filter 103b, a D/A converter (D/A Cnv.) 103c, an A/D converter (A/D Cnv.) 103d, a register 103e, etc., and encodes and decodes data supplied thereto through a telephone line (L) 105, and sound signals supplied thereto through the sound codec 106 (which operates a speaker phone codec). The DSP 103a of the modem codec 103 performs echo canceling and divides sound into transmitted sound and received sound. The modem codec 103 can be connected or disconnected from the sound codec 106 by means of the register 103e.

The NCU 104 is a line control circuit and performs line connection processing, such as an on-hook operation, an off-hook operation, call making, call reception, etc.

The telephone line 105 is connected to the NCU 104. In the embodiment shown in FIG. 1, the telephone line 105 connects the speaker phone device to a telephone network.

The sound codec 106 functions as a speaker phone codec as well. It contains a sound processing circuit 106a and 106b which is not only for filtering but also for sampling processing used for sound signal recording, a D/A converter (D/A Cnv.) 106*c*, an A/D converter (A/D Cnv.) 106*d*, etc. The sound codec 106 encodes transmission sound entered from a microphone (MIC) 109 and supplies the resultant encoded sound signal to the modem codec 103. In addition, the sound codec 106 decodes a digital reception sound signal received from the modem codec 103, and an analog reception sound signal obtained thereby is supplied to a speaker 108.

Reference numeral 107 in FIG. 1 denotes a power amplifier (A) which amplifies the reception sound signal produced from the sound codec 106. The amplified reception sound signal is supplied to the speaker 108. By this speaker, the reception sound signal is converted into audible sound and output.

The microphone (MIC) 109 receives sound and converts it into an electric signal. This electric signal is supplied to a microphone amplifier (A), by which it is amplified and supplied to the sound codec 106.

Reference numeral 111 denotes an exclusive line used for connecting the SCD 106 and the MCD 103 directly to each other. In the embodiment shown in FIG. 1, the line 111 is made of a serial data line.

FIG. 2 shows the second embodiment of the present invention. According to this embodiment, a modem codec having a speaker phone function is incorporated in an information processing apparatus. The modem codec is connected directly to a sound codec, and efficient use is made of those hardware components of the sound codec which achieve the sound processing function, such that the sound processing function by the sound codec and the speaker phone function by the speaker phone codec are realized simultaneously.

Referring to FIG. 2, reference numeral 201 denotes a system interface of the information processing apparatus. In the embodiment shown in FIG. 2, the system interface connects the system of the information processing apparatus to the speaker phone device incorporated in the information processing apparatus.

Reference numeral 202 denotes an MPU connected between the system interface 201 and a modem codec 203 (which will be described below). Under the control of the CPU of the system, the MPU 202 controls the modem codec 203 and an NCU 204.

The modem codec 203 is connected between the MPU 202, the NCU 204 and a speaker phone codec 206. It contains a DSP (digital sound processor) 203*a*, a filter 203*b*, a D/A converter (D/A Cnv.) 203*c*, an A/D converter (A/D Cnv.) 203*d*, a register 203*e*, etc., and encodes and decodes data supplied thereto through a telephone line (L) 205, and sound signals supplied thereto through the speaker phone codec 206. The DSP 203*a* of the modem codec 203 performs echo canceling and divides sound into transmitted sound and received sound. The modem codec 203 can be connected or disconnected from the speaker phone codec 206 by means of the register 203*e*.

The NCU 204 is a line control circuit and performs line connection processing, such as an on-hook operation, an off-hook operation, call making, call reception, etc.

The telephone line 205 is connected to the NCU 204. In the embodiment shown in FIG. 2, the telephone line 205 connects the speaker phone device to a telephone network.

The speaker phone codec (SPCD) 206 is designed to attain a speaker phone function. It contains a filter 206*a*, a D/A converter (D/A Cnv.) 206*b*, an A/D converter (A/D Cnv.) 206*c*, etc. The speaker phone codec 206 encodes transmission sound entered from a microphone (MIC) 207 and supplies the resultant encoded sound signal to the modem codec 203. In addition, the speaker phone codec 206 decodes a digital reception sound signal received from the modem codec 203, and an analog reception sound signal obtained thereby is supplied to a speaker 213.

The microphone 207 receives sound and converts it into an electric signal. This electric signal is supplied to a microphone amplifier (A) 208, by which it is amplified and supplied to a sound codec (SCD) 209.

The sound codec 209 is designed to attain a sound processing function. It contains a sound processing circuit 209*a* which is not only for filtering but also for sampling processing used for sound signal recording, a D/A converter (D/A Cnv.) 209*b*, an A/D converter (A/D Cnv.) 209*c*, etc. The sound codec 209 encodes and decodes signals which are input thereto or output therefrom, and further performs filtering. In addition, the sound codec SCD 209 supplies encoded sound data to a recording means. This recording means may be provided either inside or outside of the sound codec 209. For example, the encoded sound data is recorded by a media player by utilization of known sampling processing included in the sound processing function provided by an OS, such as Windows (trademark).

Reference numeral 210 denotes a switch for physically allowing passage of a sound output supplied from the sound codec 209. In the embodiment shown in FIG. 2, the switch 210 is ON/OFF-controlled in accordance with the information (RB) stored in the register 203*e* of the modem codec 203. The switch 210 is used, for example as follows. Let us consider a case where the speech signal from the SPCD 206 and the sound signal from the SCD 209 are synthesized together by a mixer 211, and the resultant sound signal is supplied to the speaker 213. In this case, the sound signal output from the speaker 213 may be picked up by the microphone 207, resulting in howling. To avoid this problem, the switch 210 is turned off so that only the speech signal from the SPCD 206 is output supplied to the speaker 213. In the second embodiment, recording is performed by the SCD 209, so that the sound picked up by MIC 207 is recorded.

The mixer 211 mentioned above is designed to mix analog sound signals together. In the second embodiment, the mixer 211 is employed for mixing the sound output decoded by the speaker phone codec 206 and the sound output decoded by the sound codec 209 with each other.

Reference numeral 212 in FIG. 2 denotes a power amplifier (A) for amplifying the sound signal output from the mixer 211. After being amplified, the sound signal is supplied to the speaker (SP) 213. By this speaker, the sound signal is converted into audible sound and output.

FIG. 3 shows the third embodiment of the present invention. It is a block circuit diagram showing a speaker phone device which is of a type incorporated in an information processing apparatus. According to the third embodiment, the speaker phone device is designed to attain the function wherein the speech made through a speaker phone is recorded by the sound codec. The structural elements shown in FIG. 3 correspond to those enclosed in block 10 in FIG. 2, and illustration of some structural elements, such as a modem codec, a speaker phone codec, etc., is omitted from FIG. 3. The second embodiment shown in FIG. 2 has problems in that the sound signal output from the speaker 213 may be picked up from the microphone 207, adversely affecting the quality of the sound to be recorded. In the third embodiment, however, an output from the SPCD 206 is supplied to an SCD 304 by way of a mixer 303. This being so, the third embodiment is superior to the second embodiment in that sound can be recorded with improved quality.

Referring to FIG. 3, reference numeral 301 denotes a microphone corresponding to that (207) shown in FIG. 2, reference numeral 302 denotes a microphone amplifier corresponding to that (208) shown in FIG. 2, reference numeral 304 denotes a microphone corresponding to that (209) shown in FIG. 2, reference numeral 305 denotes a switch corresponding to that (210) shown in FIG. 2, reference numeral 306 denotes a mixer corresponding to that (211) shown in FIG. 2, reference numeral 307 denotes a power amplifier corresponding to that (212) shown in FIG. 2, reference numeral 308 denotes a speaker corresponding to that (213) shown in FIG. 2, and reference numeral 309 denotes a system interface corresponding to that (201) shown in FIG. 2.

Reference numeral 303 in FIG. 3 denotes a mixer (MX) connected between the microphone amplifier 302 and the sound codec 304. The mixer (MX) receives a sound input supplied thereto from the microphone 301 and a decoded sound output supplied thereto from the speaker phone codec 304, and synthesizes them together. The signal obtained by this synthesis is supplied to the sound codec 304.

The sound codec 304 encodes and decodes signals which are input thereto or output therefrom, and further performs filtering. In addition, the sound codec 304 supplies encoded sound data to a recording means. This recording means may be provided either inside or outside of the sound codec 304.

An output signal produced directly from the mixer 303 may be recorded by the recording means. When this is done, the speech made through the speaker phone can be recorded as analog signals.

FIG. 4 shows part of the information recorded in the register 103e (203e) of the modem codec 103 (203) employed in each of the above embodiments. In FIG. 4, RA denotes a speaker phone enable register which stores a speaker phone enable signal generated under the control of the CPU of the system.

In the first embodiment, register RA is used for selectively establishing a signal transmission path between the modem codec 103 and the encoded signal input/output terminal of the sound codec 106 (which serves as a speaker phone codec). For example, the signal transmission path is established when the speaker phone is used, thereby connecting the speaker phone device to a telephone network.

In the second and third embodiments, register RA is used for selectively establishing a signal transmission path between the modem codec 203 and the encoded signal input/output terminal of the speaker phone codec 206. For example, the signal transmission path is established when the speaker phone is used, thereby connecting the speaker phone device to a telephone network.

In FIG. 4, RB denotes a sound codec output enable register which stores a sound codec output enable signal generated under the control of the CPU of the system. It is used for selectively turning on or off the switch 210 (305) provided in the sound output signal path connected to the sound codec 209 (304).

Figure 5:
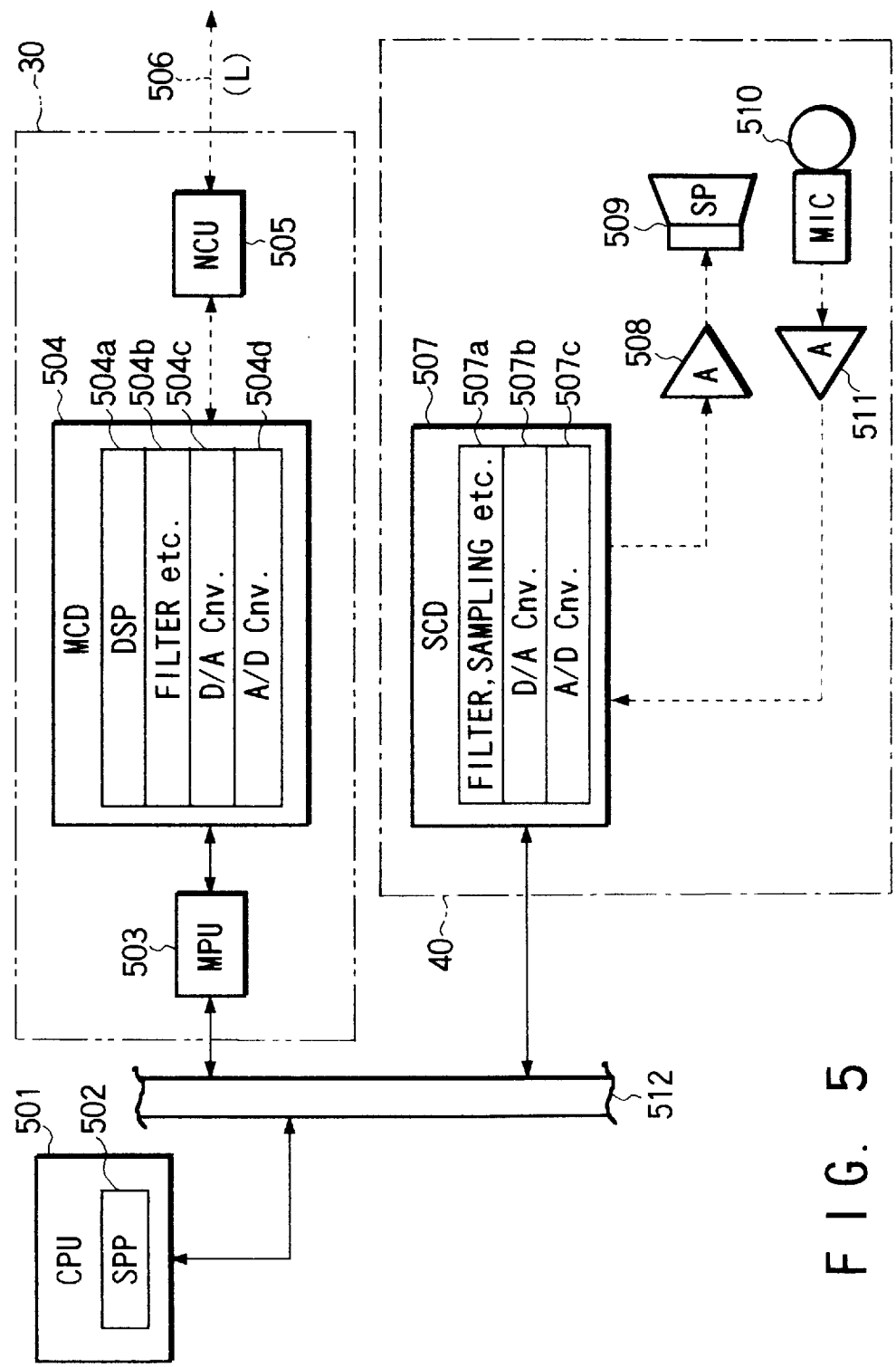
FIG. 5 is a block circuit diagram showing the structure according to the fourth embodiment.

FIG. 5 shows the fourth embodiment of the present invention. It is a block circuit diagram showing a speaker phone device of a type incorporated in an information processing apparatus. According to the fourth embodiment, a modem codec and a sound codec are linked together through a system interface under the control of the CPU of the apparatus. The sound codec functions as a speaker codec, and the microphone and speaker connected to the sound codec are used as a transceiver. In this manner, the speaker phone circuit is selectively formed. In the first, second, and third embodiments, the speaker phone function is realized by hardware. The fourth embodiment differs from them in that the speaker phone function is realized by software 502 by utilizing the CPU 501 of the information processing apparatus.

Referring to FIG. 5, reference numeral 30 denotes a modem section including a modem codec, and reference numeral 40 denotes a sound section including a sound codec.

Reference numeral 501 in FIG. 5 denotes a CPU which controls the entire system of the information processing apparatus. The CPU functions as a system processor of the information processing apparatus. In the embodiment shown in FIG. 5, the CUP 501 executes the processing based on the speaker phone program (SPP) stored in the speaker phone program storage area 502 of the RAM, so as to control the sound codec 507 of the sound section 40 as a speaker phone codec.

The speaker phone program storage area 502 of the RAM stores the speaker phone program (SPP) executed by the CPU 501. By execution of this program, the sound codec 507 of the sound section 40 is controlled as a speaker phone codec, and a microphone 511 and a speaker 509, both connected to the sound codec 507, are used as a transceiver. In this manner, a speaker phone device is selectively realized.

Reference numerals 503, 504 and 505 denote structural elements of the modem section 30. Element 503 is an MPU connected between the system interface 512 and the modem codec 504. Under the control of the CPU 501 of the system, the MPU 503 controls the modem codec 504 and NCU 505.

Element 504 is a modem codec (MCD) connected between the MPU 503 and the NCU 505. It contains a DSP (digital sound processor) 504a, a filter 504b, a D/A converter (D/A Cnv.) 504c, an A/D converter (A/D Cnv.) 504d, etc. and encodes and decodes data supplied thereto through a telephone line (L) 506. The modem codec functions as an interface with reference to the telephone line (L) 506. The DSP 504a of the modem codec 504 performs echo canceling and divides sound into transmitted sound and received sound.

Element 505 is an NCU (Network Control Unit) and performs line connection processing, such as an on-hook operation, an off-hook operation, call making, call reception, etc.

The telephone line 506 is connected to the NCU 505. In the embodiment shown in FIG. 5, the telephone line 506 connects the speaker phone device to a telephone network.

Reference numerals 507 to 511 denote structural elements of the sound section 40. Of these, element 507 is a sound codec (SCD) functioning as a speaker phone codec. It contains a sound processing circuit 507a which is not only for filtering but also for sampling processing used for sound signal recording, a D/A converter (D/A Cnv.) 507b, an A/D converter (A/D Cnv.) 507c, etc. In the embodiment shown in FIG. 5, the sound codec 507 encodes speech signals which are input thereto from a microphone (MIC) 510, and supplies the encoded speech signals to the system interface 512 as data which can be processed in accordance with the speaker phone program (SPP). In addition, the sound codec 507 decodes encoded speech data which is input thereto from the system interface 512 after being processed on the basis of the speaker phone program (SPP), and supplies the resultant analog data to the speaker 509.

Reference numeral 508 in FIG. 5 denotes a power amplifier (A) for amplifying the sound signal output from the sound codec 507. After being amplified, the sound signal is supplied to the speaker (SP) 509. By this speaker, the sound signal is converted into audible sound and output.

The microphone 510 receives sound and converts it into an electric signal. This electric signal is supplied to the microphone amplifier (A) 511, by which it is amplified and supplied to the sound codec (SCD) 507.

When the CPU 501 executes the speaker phone program (SPP), the system interface 512 of the information processing apparatus serves as an interface between the modem section 30 and the sound section 40 under the control of the CPU 501.

A description will now be given as to how the embodiments mentioned above operate.

First of all, the operation of the first embodiment of the present invention will be described with reference to FIG. 1.

In the speaker phone device according to the first embodiment, the information processing apparatus is regarded as a telephone. The microphone 109 removably provided for the information processing apparatus is used as a transmitter of the speaker phone, while speaker 108 incorporated or removably provided for the apparatus is used as a receiver of the speaker phone. In addition, the sound codec 106 incorporated or removably provided for the information processing apparatus is controlled to operate as a speaker phone codec.

A transmission speech signal input from the microphone 109 is first amplified by the microphone amplifier 110, and is then supplied to the sound codec 106 functioning as a speaker phone codec. The speech signal is input to the sound codec 106 as an analog signal.

The sound codec 106 encodes the analog speech signal input from the microphone 109, and supplies the resultant digital signal (transmission speech data) to the modem codec 103.

The modem codec 103 decodes the transmission speech data supplied from the sound codec 106. After conversion into an analog speech signal, the modem codec 103 transmits the speech data to the telephone line 105 by way of the NCU 104.

An on-hook operation, an off-hook operation, call making, call reception, and other telephone connection processing are performed by the modem codec 103 and the NCU 104 under the control of the MPU 102.

In this manner, the speech signal is transmitted, using the microphone 109 as a transmitter and using the sound codec 106 as a speaker phone codec.

A reception speech signal sent from the telephone line 105 is reproduced by following reverse procedures to those of the transmission operation mentioned above.

To be specific, an analog reception speech signal is supplied to the modem codec 103 by way of the NCU 104. The modem codec 103 encodes the analog reception speech signal, thereby producing a digital reception speech signal (reception speech data).

The encoded speech (reception speech data) is decoded by the sound codec 106 functioning as a speaker phone codec. The resultant signal is amplified by the power amplifier 107 and output from the speaker 108.

In this manner, the speech signal is received, using the speaker 108 as a receiver and using the sound codec 106 as a speaker phone codec.

As described above, in the first embodiment of the present invention, the microphone 109 and speaker 108, incorporated or removably provided for the sound codec 106 which is originally provided for the information processing apparatus to record or reproduce music, are used as a speaker phone. In this manner, the speaker phone function is realized by making good use of hardware components originally provided for the information processing apparatus.

In addition, the sound codec 106 is used as a speaker phone codec. This also ensures efficient use of the hardware components originally provided for the information processing apparatus when the speaker phone function is realized.

As can be seen from the above, a reduction in the number of structural components required, a decease in the installation area needed, a low manufacturing cost, and various other advantages are produced when an information processing apparatus, such as a personal computer, a work processor, a portable information terminal device is designed to have a speaker phone function.

Next, the operation of the second embodiment will be described. A speaker phone device according to this embodiment simultaneously realizes the sound processing function based on the sound codec and the speaker phone function based on the speaker phone codec, by making efficient use of those hardware components of the sound codec which achieve the sound processing function.

A transmission speech signal input from the microphone 207 is first amplified by the microphone amplifier 208, and is then supplied to the speaker phone codec 206 as an analog signal.

The speaker phone codec 206 encodes the speech signal input from the microphone 207, and supplies the resultant digital signal (transmission speech data) to the modem codec 203.

The modem codec 203 decodes the transmission speech data supplied from the speaker phone codec 206. After conversion into an analog speech signal, the modem codec 203 transmits the speech data to the telephone line 205 by way of the NCU 204.

An on-hook operation, an off-hook operation, call making, call reception, and other kinds of telephone connection processing are performed by the modem codec 203 and the NCU 204 under the control of the MPU 202.

In this manner, the speech signal is transmitted from the speaker phone, using the microphone 207 of the sound codec 209 as a transmitter.

A reception speech signal sent from the telephone line 205 is reproduced by performing reverse procedures to those of the transmission operation mentioned above.

To be specific, an analog reception speech signal is supplied to the modem codec 203 by way of the NCU 204. The modem codec 203 encodes the analog reception speech signal, thereby producing a digital reception speech signal (reception speech data).

The encoded speech (reception speech data) is decoded by the speaker phone codec 206. The resultant signal is supplied to the power amplifier 212 by way of the mixer 211 and then output from the speaker 213.

In this manner, the speech signal is received, using the speaker 213 of the sound codec 209 as a receiver.

As described above, the information processing apparatus comprises both the speaker phone codec 206 and the sound codec 209. Both the sound processing function and the speaker phone function are attained, using the same speaker 213 and microphone 207 in common.

With respect to the second embodiment, it should be noted that an output (transmission speech) from the microphone amplifier 208 is supplied to both the speaker phone codec 206 and the sound codec 209.

With this configuration, the microphone 207 inevitably picks up the speech signal output from the speaker 213, so that reception speech signal is supplied to both the speaker phone codec 206 and the sound codec 209.

The reception speech signal output from the speaker phone codec 206 is supplied to the mixer 211, where it is mixed with the sound output from the sound codec 209. The signal produced from the mixer 211 is output from the speaker 213.

The transmission speech signal supplied from the speaker phone codec 206 to the modem codec 203 may include a reception sound signal.

Upon reception of this transmission speech signal, the modem codec 203 causes the incorporated DSP 203a to performs an echo canceling operation, so that only the transmission speech signal is transmitted to the telephone line.

The sound codec 209 has a recording means which is either incorporated therein or externally connected thereto. The speech signals exchanged through the sound codec 209 are supplied to the recording means.

Hence, the speech made through the speaker phone can be recorded. According to the second embodiment, the switch 210 is provided at the sound output terminal of the sound codec 209. When this switch 210 is open, the sound output from the sound codec 209 is not supplied to the speaker 213.

If the output from the sound codec 209 and the output from the speaker phone codec 206 mix with each other, the resultant signal may adversely affect the operation of the speaker phone. This is why the output from the sound codec 209 is selectively shut off.

The output of the sound codec 209 is controlled by the switch 210. Under the control of the CPU of the information processing apparatus, the switch 210 is ON/OFF-controlled in accordance with the sound codec output enable signal which is stored in the sound codec output enable register RB shown in FIG. 4.

In the second embodiment, the circuits within the block 20 indicated by the alternate long and short dash lines can be incorporated in the same codec. In this case, the speaker phone codec 206 and the sound codec 206 are incorporated in the same codec unit.

With the circuit configuration of the second embodiment, a reduction in the number of structural components required, a decease in the installation area needed, a low manufacturing cost, and various other advantages are produced when the sound processing function based on the sound codec and the speaker phone function based on the speaker phone codec are simultaneously attained by making efficient use of those hardware components of the sound codec which achieve the sound processing function.

The operation of the third embodiment will now be described with reference to FIGS. 2 through 4.

The third embodiment is an embodiment wherein the speech signals made through the speaker phone are recorded by use of the sound codec.

The structural elements shown in FIG. 3 correspond to those enclosed in block 10 in FIG. 2, and illustration of some structural elements, such as a modem codec, a speaker phone codec, etc., is omitted from FIG. 3. The microphone 301, microphone amplifier 302, mixer 306, power amplifier 307 and speaker 308 shown in FIG. 3 correspond to the microphone 207, microphone amplifier 208, mixer 211, power amplifier 212 and speaker 213 shown in FIG. 2, respectively.

In the third embodiment, the reception speech signal output from the speaker phone codec 206 is supplied to the mixer 303. By this mixer, the reception speech is mixed with the transmission speech supplied from the microphone 301. The resultant signal is supplied from the mixer 303 to the sound codec 304.

Responsive to the transmission and reception speech signals supplied from the mixer 303, the sound codec 304 records the speech made through the speaker phone (transmitted speech and received speech) by use of the recording means which is either incorporated in the sound codec or externally connected thereto.

In the third embodiment, the switch 305 is provided at the sound output terminal of the sound codec 304, as in the second embodiment. When it is likely that the signal obtained by mixing the outputs of the sound codec 304 and speaker phone codec 206 will adversely affect the operation of the speaker phone, the switch 305 is opened, thereby selectively shutting off the output from the sound codec 304. The control of the output of the sound codec 304 is performed by the switch 305. This switch 305 is ON/OFF-controlled by the CPU of the information processing apparatus in accordance with the sound codec output enable signal which is stored in the sound codec output enable register RB shown in FIG. 4.

The operation of the fourth embodiment will now be described with reference to FIG. 5.

The speaker phone device according to the fourth embodiment is featured in that the sound codec and the modem codec are not directly connected to each other. According to the fourth embodiment, the modem codec and the sound codec are linked together through the system interface under the control of the CPU of the information processing apparatus. The sound codec is controlled for use as a speaker phone codec, and the microphone and speaker connected to the sound codec are used as a transceiver, thereby selectively forming the speaker phone circuit.

In FIG. 5, reference numeral 30 denotes a modem section including a modem codec, and reference numeral 40 denotes a sound section including a sound codec. In the speaker phone program storage area 502 of the RAM, the speaker phone program (SPP) for realizing the speaker phone function is stored. The CPU 501 executes this program so that the sound codec 507 of the sound section 40 can operate as a speaker phone codec.

The transmission speech signal input from the microphone 510 is amplified by the microphone amplifier 511, and is thereafter supplied to the sound codec 507 serving as a speaker phone codec. The transmission speech signal is supplied to the sound codec 507 as an analog signal.

Under the control of the CPU 501 operating on the basis of the speaker phone program (SPP), the sound codec 507 encodes the transmission speech signal input from the microphone 510. The transmission speech data obtained by this encoding is transmitted to the system interface 512.

The CPU 501 receives the transmission speech data which is supplied thereto from the sound codec 507 by way of the system interface 512. Upon reception of this data, the CPU 501 transfers it to the modem codec 504 by way of the system interface 512 and the MPU 503. The transfer control of this speech data may be performed in two ways. In one of the ways, the CPU 501 supplies transmission speech data to the MPU 503 as soon as it receives the data from the system interface 512, and then the MPU 503 transfers the transmission speech data to the modem codec 504. In the other way, the MPU 503 does not take part in the data transfer. That is, the CPU 501 supplies the transmission speech data directly to the modem codec 504.

On receiving the transmission speech data from the system interface 512, the modem codec 504 decodes the transmission speech data, converts it into an analog speech signal, and transmits the analog speech signal to the telephone line 506 by way of the NCU 505. These operations are performed under the control of the CPU 501.

An on-hook operation, an off-hook operation, call making, call reception, and other kinds of telephone connection processing are performed by the modem codec 504 and the NCU 505 under the control of the MPU 503.

In this manner, the transmission signal speech encoded by the sound codec 507 is supplied to the modem codec 504 by way of the system interface 512. After being decoded by the modem codec 504, the transmission speech signal is transmitted to the telephone line 506.

On the other hand, a reception speech signal is supplied from the telephone line 506 to the modem codec 504 by way of the NCU 506. The reception speech signal is encoded by the modem codec 504, and the resultant digital signal (reception speech data) is transmitted to the system interface 512 through the MPU 503.

The CPU 501 receives the reception speech data by way of the system interface 512, and transfers it to the sound codec 507.

The sound codec 507 decodes the reception speech data which it receives by way of the system interface 512, and then converts the decoded data into an analog reception speech signal.

The reception speech signal decoded by the sound codec 507 is amplified by the power amplifier 508 and then output from the speaker 509.

In the manner mentioned above, the information processing apparatus is allowed to have a speaker phone function, with no need to provide special hardware components, such as a speaker phone. Therefore, the speaker phone device can be realized at low cost without an increase in the number of structural elements required, and no special space is required for attaining the speaker phone function. The fourth embodiment is advantageous particularly when it is applied to a small-sized electronic apparatus which has to be carried easily, such as a portable computer, a portable word processor or PDA. The fourth embodiment enables such a small-sized electronic apparatus to have a speaker phone function without any increase in the size and weight of the apparatus.

In each of the embodiments mentioned above, a speaker phone enable signal, a sound codec output enable signal, and other enable signals generated under the control of the CPU of the system, are stored in the register of the modem codec. However, this in no way restricts the present invention. The enable signals may be stored in a register other than the register of the system. In this case, the sound codec output enable signal is not necessarily required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An information processing apparatus comprising:
   a modem codec connectable to a telephone line;
   a sound codec for encoding and decoding sound information;
   a speaker and a microphone both connected to a sound signal input/output terminal of the sound codec;
   first means for connecting the speaker and the microphone to the sound signal input/output terminal of the sound codec; and
   second means for connecting the modem codec to an encoded signal input/output terminal of the sound codec.

2. The apparatus according to claim 1, wherein the second connecting means includes a register for storing information used for selective connection of the encoded signal input/output terminal of the sound codec to the modem codec.

3. The apparatus according to claim 1, wherein
   the first means connects the speaker and the microphone, both connected to the sound codec, to the sound signal input/output terminal of a speakerphone codec; and
   the second means connects the encoded signal input/output terminal of the speakerphone codec selectively to the modem codec.

4. The apparatus according to claim 3, further comprising:
   means for synthesizing a transmission signal input to the speakerphone codec with a reception signal output from the speakerphone codec, thereby producing a transmission-reception data; and
   means for supplying the transmission-reception signal to the sound codec and receiving from the sound codec transmission-reception data used for the speakerphone.

5. The apparatus according to claim 3, wherein the first connecting means includes a register which stores control information for selectively disconnecting a sound signal output terminal of the sound codec from the speaker and for selectively outputting only a sound signal processed by the speakerphone codec.

6. The apparatus according to claim 4, wherein the first connecting means includes a register which stores control information for selectively disconnecting a sound signal output terminal of the sound codec from the speaker and for selectively outputting only a sound signal processed by the speakerphone codec.

7. The apparatus according to claim 3, wherein the second connecting means includes a register which stores first control information for selectively connecting the encoded signal input/output terminal of the speakerphone codec to the modem codec, and second control information for selectively disconnecting a sound signal output terminal of the sound codec from the speaker.

8. The apparatus according to claim 4, wherein the second connecting means includes a register which stores first control information for selectively connecting the encoded signal input/output terminal of the speakerphone codec to the modem codec, and second control information for selectively disconnecting a sound signal output terminal of the sound codec from the speaker.

9. The apparatus according to claim 4, further comprising:
   means for recording the transmission-reception data of the speakerphone.

10. The apparatus according to claim 1, further comprising:
    processing means for linking the modem codec and the sound codec by way of the system interface, thereby permitting speech signals to be exchanged between the modem codec and the sound codec.

11. An information processing apparatus which enables use of a speaker and a microphone, comprising:

a modem codec connectable to a telephone line;

a speaker phone codec, connected to the modem codec, for encoding and decoding sound information;

a sound codec;

a microphone;

a first signal path for permitting an output signal of the microphone to be supplied to both the speaker phone codec and the sound codec;

a mixer for mixing an output signal of the speaker phone codec and an output signal of the sound codec with each other;

a selective output circuit for selectively outputting the output signal of the sound codec to the mixer; and a speaker for receiving an output signal of the mixer.

12. An information processing apparatus which enables use of a speaker and a microphone, comprising:

a modem codec connectable to a telephone line;

a speaker phone codec, connected to the modem codec, for encoding and decoding sound information;

a sound codec;

a microphone;

a first mixer circuit for mixing an output signal of the microphone and an output signal of the speaker phone codec with each other, and for supplying a signal obtained thereby to the sound codec;

a second mixer circuit for mixing the output signal of the speaker phone codec and output signal of the sound codec with each other;

a selective output circuit for selectively outputting the output signal of the sound codec to the second mixer circuit; and a speaker for receiving an output signal of the mixer.

13. A method applied to an information processing apparatus which employs a modem codec connectable to a telephone line and a sound codec for encoding/decoding sound information, said method comprising the steps of:

providing an exclusive-use line exclusively used for connection of both a speaker and a microphone, and connecting the exclusive-use line to a sound signal input/output terminal of the sound codec;

causing the sound codec to convert an analog output signal of the microphone into a digital signal, and supplying the digital signal to the modem codec through the exclusive-use line;

causing the modem codec to convert the digital signal from the sound codec into an analog modulated signal, and for supplying the analog modulated signal to the telephone line;

causing the modem codec to convert the analog modulated signal supplied from the telephone line into a digital signal, and supplying the digital signal to the sound codec; and causing the sound codec to convert the digital signal supplied thereto from the modem codec into an analog signal, and supplying the analog signal to the speaker, whereby realizing a speaker phone device by means of the sound codec.

14. An information processing apparatus comprising:

a microphone;

a speaker;

a modem codec, connected to a telephone line, for converting a digital signal supplied thereto into an analog modulated signal and supplying the analog modulated signal to the telephone line, and for converting an analog modulated signal supplied from the telephone line into a digital signal and outputting the digital signal;

an exclusive-use line connected to the modem codec; and a sound codec, connected to the modem codec through the exclusive-use line, for converting an analog signal from the microphone into a digital signal and supplying the digital signal to the modem codec through the exclusive-use line, and for converting the digital signal supplied from the modem codec through the exclusive-use line into an analog signal and supplying the analog signal to the speaker.

* * * * *